United States Patent [19]

Monstrey et al.

[11] Patent Number: 5,064,872
[45] Date of Patent: Nov. 12, 1991

[54] POLYISOCYANURATE FOAM WITH CHLOROPROPANE BLOWING AGENT

[75] Inventors: Joost Monstrey, Knokke-Heist; Bart Wallaeys, Gent, both of Belgium

[73] Assignee: Recticel, Belgium

[21] Appl. No.: 487,510

[22] Filed: Mar. 2, 1990

[30] Foreign Application Priority Data

Mar. 3, 1989 [BE] Belgium ............................ 08900227

[51] Int. Cl.$^5$ ............................................. G08J 9/04
[52] U.S. Cl. ..................................... 521/131; 521/902
[58] Field of Search ................................ 521/131, 902

[56] References Cited

U.S. PATENT DOCUMENTS 3,391,093 7/1968 Frost .................................... 521/131
4,920,154 4/1990 Monstrey et al. .................. 521/131

FOREIGN PATENT DOCUMENTS 0269271 6/1988 European Pat. Off. .
1416089 of 0000 France .

*Primary Examiner*—John Kight, III
*Assistant Examiner*—Dennis R. Daley
*Attorney, Agent, or Firm*—Sughrue, Mion, Zinn, Macpeak & Seas

[57] ABSTRACT

A polyisocyanurate foam or a with polyurethane modified polyisocyanurate foam having a mainly closed cell structure and also a method for preparing this foam, the latter comprising closed cells wherein chloropropane, preferably 2-chloropropane, whether or not with another gas, is enclosed.

12 Claims, No Drawings

POLYISOCYANURATE FOAM WITH CHLOROPROPANE BLOWING AGENT

The invention relates to a polyisocyanurate foam or a with polyurethane modified polyisocyanurate foam, which shows very good fire-resistant and thermo-insulating properties.

The presently known polyisocyanurate foams and with polyurethane modified polyisocyanurate foams, which are prepared by using a physical blowing agent, consisting of chlorofluorohydrocarbons, distinguish themselves as an insulation material by their good and lasting insulation coefficient, their good dimensional stability and their excellent fire behaviour.

It is accepted that the use of these chlorofluorohydrogen compounds, which offer as such a good fire-resistance, contribute to the excellent fire behaviour of the foams concerned.

As is well-known, such blowing agents show however important drawbacks and nowadays it is accepted that they are the cause of the destruction of the ozone layer in the stratosphere and would at the same time increase the greenhouse effect on earth.

According to the invention there is tried to remedy these important drawbacks and to propose a polyisocyanurate foam or a with polyurethane modified polyisocyanurate foam which shows still the above mentioned good properties, especially the good insulation coefficient and the excellent fire behaviour, but not the desadvantages of the ones which are involved with the use of chlorofluorohydrocarbons.

To this end, the polyisocyanurate foam or the with polyurethane modified polyisocyanurate foam shows, according to the invention, closed cells wherein chloropropane, whether or not with another gas, is enclosed.

Suitably, the chloropropane consists mainly of 2-chloropropane.

The invention relates also to a method for preparing the foam concerned, wherein a physical blowing agent is used for obtaining the foam structure, which method is characterized in that a chloropropane containing physical blowing agent is applied.

In a particular embodiment of the invention, use is made of a physical blowing agent consisting for at least 90% and preferably completely of chloropropane.

Other particularities and advantages of the invention will become apparent from the following description wherein some specific examples of the polyisocyanurate foam or with polyurethane modified polyisocyanurate foams, and also of a method for preparing this foam, are described; this description is only given by way of example and does not limit the scope of the invention.

For the manufacture of these polyisocyanurate foams, use is essentially made of the mutual trimerization and other reactions of polyisocyanates, caused by typical catalysts. These polyisocyanurates are known for their exceptional fire behaviour.

Since pure polyisocyanurate foams often have inadequate physical properties, they are in practice usually mixed with polyurethanes based on the same isocyanate and certain polyols, so that a reaction starts which develops synchronously with the trimerization. These foams are called polyurethane modified polyisocyanurates.

Besides the polyisocyanate, the polyols, the typical catalysts and the blowing agents, use is moreover made of foam stabilizers, flame extinguishing additives, etc.

The organic polyisocyanate compounds are of the $R(NCO)_n$ type, wherein $n>2$ and R represents an aliphatic or aromatic group. Preferably, use is made of diisocyanates or polyisocyanates comprising on average 2 to 4 isocyanate groups per molecule. A typical example thereof is diphenylmethane-4,4'-diisocyanate (MDI) and mixtures of the latter with its polymeric forms ("crude" MDI), which are usually applied in the manufacture of rigid polyurethane foam and polyisocyanurate foam.

Under the influence of specific catalysts, such isocyanates can mutually react by dimerization and trimerization to form polyisocyanurate. In order to modify such polyisocyanurates with polyurethanes, each molecule with active hydrogen groups: R—OH, R13 COOH, R—SH, $R_2$—NH, R—$NH_2$, R—SH, ... is in principle appropriate for use as reactive substrate. Preferably, there is started from polyalcohols of the polyetherpolyol or polyesterpolyol type or mixtures thereof.

A molecular weight $>150$, and preferably between 500 and 5000, is characterizing. The functionality is always higher or equal to 2 and an important property is a hydroxyl number (IOH) between 25 and 1000, more specifically between 150 and 850. Also for this reaction, there exists more specific catalysts.

Where, for the preparation of polyurethane, use is made of an isocyanate index situated near the stoechiometric ratio, i.e. 95 to 110, a much higher index is necessary for the preparation of polyurethane modified polyisocyanurates so as to allow the mutual isocyanate trimerization reaction. Normally, this isocyanate index is $>150$.

In order to obtain the typical foam structure, there is started from a chemical or physical blowing agent. As a chemical blowing agent, $H_2O$ is used, which liberates $CO_2$ "in situ" by reaction with isocyanate. As physical blowing agents, low boiling organic liquids are used which evaporate by the exothermic trimerization, urethane and urea reactions and lead also to the typical foam structure.

As physical blowing agents, use is usually made of chlorofluorohydrocarbon compounds (CFC's), such as for example trichlorofluoromethane, trichlorofluoroethane, dichlorotrifluoroethane, dichlorofluoroethane, or other analogous compounds or combinations thereof.

In this invention, an important part of the CFC's or the whole of them are replaced by 2-chloropropane. Also other blowing agents such as for example pentane, isopentane, etc., mixed with 2-chloropropane, can be used. The total blowing agent amount which is used, is dependent on the foam density to be reached and on the molecular weight of the blowing agent. Amounts between 1 and 50% by weight, an preferably between 1 and 30% by weight, are typical.

As a foam stabilizer, silicon based products, such as polyalkylsiloxane polyether copolymers, are mostly used. Use can also be made of non silicon containing tensio-active substances. Preferably, amounts of 0.1–10 parts by weight, and more specifically between 0.5 and 2 parts by weight, are used per 100 parts by weight polyol.

Use is made, as a catalyst, of tertiary amine compounds, such as for example N,N'-dimethylcyclohexylamine, diaminobicyclo-octane (DABCO), etc., or metal salts or alkali or alkaline-earth metal salts of organic or anorganic origin, such as for example potassium octoate, dibutyltin dilaurate.

The catalysts which catalyse more specifically the trimerization can present the following structural formula:

R1R2R3N
R3P
R-OMe wherein Me is an alkali metal
Me$_x$O$_y$
RCOOMe wherein Me=K, Na, Ca, Fe, Mg, Hg, Ni, Pb, Co, Zn, Cr, Al, Sn, V, Ti
R-Me- wherein Me=Zn, Si, Sn, Pb, Sb
R2Me
R3Me In these formulas, R, R1, R2, and R3 represent hydrogen radicals, organic, anorganic Lewis acids,
amine—epoxide combined catalysts,
amine—alkylene combinations,
amide—imide mixtures.

Essentially, the balance between the trimerization reactions and the polyurethane formation is kept in equilibrium by means of these catalysts. The amounts which are used here are dependent on the catalytic activity and are typically situated between 0.01 and 10 parts by weight, and more specifically between 0.01 and 4 parts by weight, per 100 parts by weight polyol.

Extra additives, such as for example fire retardants (phosphorus and halogen containing additives or polyols), smoke suppressors, additional cross-linkers, fillers, diluents, etc. can always be added to give the final product certain specific properties. This invention allows to manufacture foams either according to a continuous process, or according to a discontinuous process and this as well in the shape of plates, whether or not coated, blocks, in situ moulded pieces and as sprayed foam.

The physical properties (and the corresponding norm) which have been measured for the tested rigid foams, are summed up in Table 1.

TABLE 1

| Physical properties, units and corresponding norms. | | |
|---|---|---|
| Physical property | Unit | Norm |
| Core density | kg/m$^3$ | DIN 53420 |
| Compression-hardness | kPa | DIN 53421 |
| Thermal conductivity ($\lambda$) | W/mK | ISO 2581 |
| Dimensional stability | % | ISO 2796 |
| Closed cells | % | ASTM D 2856 |
| Combustibility | Class: SE (self extinguishing) | ASTM D 1692 |
| B2 test | B2–B3 | DIN 4201 B2/B3 |
| Epiradiator test | M4 tot M1 | NF 92-501 |
| LOI | % | ASTM D 2863 |
| Tunneltest | Class | ASTM E84 |
| Friability | % | ASTM C 421 |

In order to be able to evaluate the $\lambda$ value under real circumstances sufficiently fast, a fastened aging method is used here.

The $\lambda$ value is measured after the foam manufacture and further as a function of time, the samples being conditioned at 70° C. and this during a time period untill 15 weeks after the manufacture. This $\lambda$ value is a stabilized value and can be correlated with the final, long-term insulation value of the foam under real use conditions.

The following examples illustrate the use of 2-chloropropane.

EXAMPLES 1-5

In this series, the influence on the various properties of the complete and partial substitution of trichlorofluoromethane for 2-chloropropane in a with polyurethane modified polyisocyanurate foam has been determined. The 2-chloropropane amount has been adjusted in each test so as to always obtain an analogous foam density ($\pm 30$ kg/m$^3$).

In these examples, prepared on laboratory scale by hand-mixing, use has been made of a polyol, being an addition product of sorbitol with propylene oxide/ethylene oxide, characterized by a Brookfield viscosity of 2000 mPa.s and a hydroxyl number (IOH) of 440 (Polyol Tercarol PR 70051). The formulations as used in these examples, are shown in Table 2. Use has been made here of an isocyanate index of 150 and of a "crude" MDI having an equivalent weight of 135.

At first, a mixture of polyol, silicon, water, additives and catalysts has been made in a beaker. Then the blowing agents have been added to this mixture and mixed thoroughly. The blowing agent amount in the mixture has always been controlled carefully in order to take in this way the partial blowing agent evaporation into account. The final formulations describe always these amounts which are really dissolved in the polyol mixture.

Finally, this mixture has been mixed very intensely with isocyanate during about 8 seconds at about 3000 revolutions per minute (RPM) whereupon the foam reaction started immediately. After a cooling period, the obtained foams have been evaluated as to their physical properties (Table 3).

TABLE 2

| Formulations as used in examples 1-5 | | | | | |
|---|---|---|---|---|---|
| | Example | | | | |
| Composition | 1 | 2 | 3 | 4 | 5 |
| Polyol Tercarol PR70051* | 100 | 100 | 100 | 100 | 100 |
| (silicon) B1903** | 1,5 | 1,5 | 1,5 | 1,5 | 1,5 |
| H2O | 0,2 | 0,2 | 0,2 | 0,2 | 0,2 |
| 2,4,6 Tri(dimethylamino-methy)phenol/K acetate 50/50) | 1,5 | 1,5 | 1,5 | 1,5 | 1,5 |
| Trichlorofluoromethane | 43 | 32 | 21 | 9 | — |
| 2-Chloropropane | — | 6,8 | 13,4 | 21,8 | 27,1 |
| MDI (Desmodur 44V40)*** | 163 | 163 | 163 | 163 | 163 |

*A Carbochim trademark
**A Th. Goldschmidt trademark
***A Bayer trademark

TABLE 3

| Physical properties of the foams as manufactured in examples 1-5 | | | | | |
|---|---|---|---|---|---|
| Phys. | Example | | | | |
| properties | 1 | 2 | 3 | 4 | 5 |
| Density (kg/m$^3$) | 30,1 | 29,8 | 29,7 | 30,5 | 29,1 |
| Hardness (kPa) | 210 | 223 | 206 | 240 | 203 |
| Fire test | | | | | |
| ASTM D 1692 | SE | SE | SE | SE | SE |
| DIN 4102 | B3 | B3 | B3 | B3 | B3 |
| NF 92-501 | M4 | M4 | M4 | M4 | M4 |
| LOI (%) | 23 | 23 | 23 | 23 | 23 |
| % closed cells | 91,0 | 89,9 | 92,7 | 91,3 | 90,7 |
| Friability | 9,2 | 8,7 | 9,8 | 10,2 | 9,1 |
| Dim. stability ($\Delta$ V in %) | <2 | <2 | <2 | <2 | <2 |
| $\lambda$ initial | 0,0190 | 0,0194 | 0,0198 | 0,0200 | 0,0209 |
| $\lambda$ after 15 W 70° C. | 0,0240 | 0,0238 | 0,0245 | 0,0249 | 0,0249 |

From this table, it appears that with 2-chloropropane, either in its pure form or as a mixture with trichlorofluoromethane, foams are obtained having properties which are, especially as for fire resistance, comparable with the reference foam (ex. 1).

EXAMPLES 6–10

In this series, use has been made exclusively of 2-chloropropane and the influence of the blowing agent amount on the foam density has specifically been determined.

The influence on the fire behaviour can also be seen by means of an extra addition of the fire retardant dimethylmethyl phosphonate (DMMP).

In these examples, use has been made of a polyol with an aromatic initiator and a hydroxyl number of 510 and a Brookfield viscosity of 15 000 mPa.s. The formulations are shown in Table 4. The isocyanate index was in these examples 180.

TABLE 4

Formulations as used in examples 6–10.

| Composition | Example | | | | |
|---|---|---|---|---|---|
| | 6 | 7 | 8 | 9 | 10 |
| Polyol Caradol MD 944* | 100 | 100 | 100 | 100 | 100 |
| Silicon Dabco DC193** | 1,2 | 1,2 | 1,2 | 1,2 | 1,2 |
| Fire retardant DMMP | — | 4 | — | 4 | — |
| TMR (catalyst)** | 0,6 | 0,6 | 0,5 | 0,5 | 0,5 |
| K octoate | 0,7 | 0,8 | 0,8 | 0,8 | 0,8 |
| 2-chloropropane | 24,7 | 20,6 | 13,0 | 10,1 | 10,1 |
| MDI (Desmodur 44V40)*** | 220,9 | 220,9 | 220,9 | 220,9 | 220,9 |

*A Shell trademark
**An Air Products trademark
***A Bayer trademark.

The important physical properties of these foams are shown in Table 5.

TABLE 5

Most important physical properties of the foams as obtained in examples 6–10.

| Phys. prop. | Composition | | | | |
|---|---|---|---|---|---|
| | 6 | 7 | 8 | 9 | 10 |
| Density (kg/m$^3$) | 30,7 | 39,1 | 51,6 | 55,6 | 54,9 |
| Hardness (kPa) | 208 | 342 | 462 | 583 | 562 |
| Fire behaviour (DIN 4102) | B3 | B2 | B3 | B2 | B3 |
| λ initial | 0,0169 | 0,0175 | 0,0189 | 0,0197 | 0,0220 |
| λ after 15 W 70° C. | 0,0220 | 0,0233 | 0,0242 | 0,0253 | 0,0257 |

From this Table it appears that it is possible to control the foam density only by means of 2-chloropropane as a blowing agent. The obtained hardnesses are completely comparable with foam of a similar density and blown only with trichlorofluoromethane.

EXAMPLES 11–20

In this series, completely halogenated and incompletely halogenated chlorofluorohydrocarbons have been compared as blowing agent, whether or not mixed with 2-chloropropane.

The total blowing agent amount has been adjusted also in this case in such a manner that a foam density of ±30 has been obtained.

In these examples, use has been made of a polyesterpolyol starting from polymers based on polyalkyleneterephthalic acid. The hydroxyl number of this polyol was 230. As a blowing agent, use has been made of 2-chloropropane, either in its pure form or in combination with a chlorofluorohydrocarbon compound. The various foams have been manufactured in the shape of plates on a double belt machine. The covering consists of a "coated" glass fiber mat of 300 g/m$^2$. The formulations are shown in Table 7. There has been started from an isocyanate index of 250. The physical properties of these foams are shown in Table 8. It appears from this that essentially the same properties have been obtained when using 2-chloropropane, either pure or in combination with halogenated hydrocarbons, as blowing agent.

TABLE 7

Formulations as used in examples 11–20

| Example | 11 | 12 | 13 | 14 | 15 | 16 | 17 | 18 | 19 | 20 |
|---|---|---|---|---|---|---|---|---|---|---|
| Polyesterpolyol Chardol 336 A* | 100 | 100 | 100 | 100 | 100 | 100 | 100 | 100 | 100 | 100 |
| Fire retardant DMMP | — | 6 | — | 6 | — | 6 | — | 6 | — | 6 |
| Silicon Dabco DC193 | 1,5 | 1,5 | 1,5 | 1,5 | 1,5 | 1,5 | 1,5 | 1,5 | 1,5 | 1,5 |
| TMR-30** | 0,2 | 0,2 | 0,2 | 0,2 | 0,2 | 0,2 | 0,2 | 0,2 | 0,2 | 0,2 |
| K-octoate | 1,6 | 1,6 | 1,6 | 1,6 | 1,6 | 1,6 | 1,6 | 1,6 | 1,6 | 1,6 |
| Trichlorofluoromethane | 37 | 38 | — | — | 18 | 19 | — | — | — | — |
| 1,1-dichloro-1-fluoroethane | — | — | — | — | — | — | 16,8 | 17,4 | — | — |
| 1,1-dichloro-2,2,2-tri-fluoroethane | — | — | — | — | — | — | — | — | 20,3 | 20,9 |
| 2-chloropropane | — | — | 22,4 | 22,4 | 11,6 | 11,6 | 11,4 | 11,4 | 11,7 | 11,7 |
| MDI (Desmodur 44V20)*** | 138 | 138 | 138 | 138 | 138 | 138 | 138 | 138 | 138 | 138 |

*A Chardanol trademark
**An Air Products trademark
***A Bayer trademark

TABLE 8

Physical properties of the foams manufactured in examples 11–20

| Properties | Example | | | | | | | | | |
|---|---|---|---|---|---|---|---|---|---|---|
| | 11 | 12 | 13 | 14 | 15 | 16 | 17 | 18 | 19 | 20 |
| Density (kg/m$^3$) | 31,0 | 30,9 | 31,7 | 32,1 | 30,9 | 30,7 | 31,0 | 30,0 | 31,2 | 31,1 |
| Hardness (kPa) | 189 | 162 | 190 | 171 | 178 | 172 | 180 | 190 | 188 | 162 |
| Fire test | | | | | | | | | | |

TABLE 8-continued

| | Physical properties of the foams manufactured in examples 11-20 | | | | | | | | | |
|---|---|---|---|---|---|---|---|---|---|---|
| | Example | | | | | | | | | |
| Properties | 11 | 12 | 13 | 14 | 15 | 16 | 17 | 18 | 19 | 20 |
| DIN4102 | B2 | B2 | B2 | B2 | B2 | B2 | B2 | B2 | B2 | B2 |
| NF92-501 | M3 | M2 | M3 | M2 | M3 | M2 | M3 | M2 | M3 | M2 |
| LOI | 24 | 26 | 24 | 26 | 24 | 26 | 24 | 26 | 24 | 26 |
| ASTM E 84 | I | I | I | I | I | I | I | I | I | I |
| Closed cells (%) | 90,1 | 93,2 | 92,7 | 93,1 | 92,8 | 91,2 | 91,9 | 92,7 | 93,1 | 94,0 |
| Dimensional stability (%) | <3 | <3 | <3 | <3 | <3 | <3 | <3 | <3 | <3 | <3 |
| λ initial | 0,0170 | 0,0175 | 0,0192 | 0,0197 | 0,0181 | 0,0188 | 0,0182 | 0,0184 | 0,0183 | 0,0189 |
| λ initial after 15 W 70° C. | 0,0230 | 0,0236 | 0,0249 | 0,0252 | 0,0238 | 0,0242 | 0,0239 | 0,0246 | 0,0240 | 0,0245 |

EXAMPLES 21 to 26

In this series the blowing agent variation is similar to the one of examples 6-10.

However, by using a combination of a polyester-polyol and a phosphorus containing polyol and in view of the high isocyanate index (350), block foams have been obtained with 2-chloropropane as blowing agent, which combine an exceptional fire resistance with very good λ values.

In these examples, foams have been manufactured according to a continuous block foaming. There has been started from a mixture of a phosphorus containing polyol and a polyesterpolyol in a 40/60 weight ratio with a hydroxyl number of 300. The applied formulations are shown in Table 9.

The isocyanate index was 350. Use has been made here of an isocyanate with a NCO content of about 28% (Tedimon 321 type).

TABLE 9

| | Formulations as used in examples 21-26. | | | | | |
|---|---|---|---|---|---|---|
| | Example | | | | | |
| Components | 21 | 22 | 23 | 24 | 25 | 26 |
| Polyol mixture | 35 | 35 | 35 | 35 | 35 | 35 |
| Amine catalyst | 0,8 | 0,8 | 0,8 | 0,7 | 0,6 | 0,6 |
| K acetate | 2,0 | 2,0 | 2,0 | 2,0 | 1,8 | 1,8 |
| 2-chloropropane | 11,4 | 10,5 | 8,0 | 6,9 | 4,8 | 2,3 |
| MDI (Tedimon 321)* | 115 | 115 | 115 | 115 | 115 | 115 |

*A Montedipe trademark.

The most important physical properties of these foams are summed up in Table 10.

TABLE 10

| | Physical properties of the foams manufactured in examples 21-26. | | | | | |
|---|---|---|---|---|---|---|
| | Example | | | | | |
| Phys. prop. | 21 | 22 | 23 | 24 | 25 | 26 |
| Density (kg/m$^3$) | 33,2 | 35,7 | 40,6 | 60 | 83 | 142 |
| Hardness (kPa) | 193 | 228 | 274 | 470 | 750 | 2050 |
| % closed cells | 92,7 | 94,0 | 93,2 | 93,7 | 92,4 | 93,0 |
| Fire test | | | | | | |
| ASTM D 1692 | SE | SE | SE | SE | SE | SE |
| DIN 4102 | B2 | B2 | B2 | B2 | B2 | B2 |
| NF 92-501 | M1 | M1 | M1 | M2 | M2 | M3 |
| LOI | 31 | 31 | 31 | 31 | 31 | 31 |
| Friability (%) | 29 | 20 | 18 | 16 | 12 | 8 |
| λ initial | 0,0180 | 0,0187 | 0,0189 | 0,0219 | 0,0261 | 0,0292 |
| λ after 15 W 70° C. | 0,0230 | 0,0235 | 0,0240 | 0,0251 | 0,0283 | 0,0304 |

It appears from this that it is possible, under the conditions as mentioned in these examples, to obtain a high fire resistance by means of isopropyl chloride.

EXAMPLE 27

In this example a foam has been manufactured on basis of a polyester based polyol, comparable to the foam formulation as used in example 11.

The foam has been manufactured in a discontinuous manner, the reacting mixture having been injected between 2 rigid coverings (steelplate). There has been started here from an isocyanate index of 300. The panels manufactured in this way, showed a good dimensional stability as well as a good fire resistant behaviour (M1 classification according to the NF92-501 test). Essentially, no significant differences between this formulation and the foams based on trichlorofluoromethane, could be detected.

EXAMPLES 28-30

In these examples, use has been made of an aromatic amine containing polyol having a hydroxyl number of 530. An isocyanurate index of 150 has been used. The applied formulations are shown in Table 11. The foams have been manufactured according to the "in situ" foam forming spray method.

TABLE 11

| | Example | | |
|---|---|---|---|
| Composition | 28 | 29 | 30 |
| Thanol 350-x* | 30 | 30 | 30 |
| Fyrol 6** | 5,0 | 5,0 | 5,0 |
| Dibutyltin dilaurate | 0,2 | 0,2 | 0,2 |
| Dabco DC 193*** | 0,3 | 0,3 | 0,3 |
| K acetate | 1 | 1 | 1 |
| 1-chloropropane | — | 4,7 | 9,2 |
| 2-chloropropane | 9,0 | 4,5 | — |
| MDI | 57,3 | 57,3 | 57,3 |

*A Texaco Chemical Company trademark
**A Stauffer Chemical Company trademark
***An Air Products trademark.

It appears that the properties of these foams are comparable with those of trichlorofluoromethane blown foams. The foams with 1-chloropropane as blowing agent show however a slight tendency to shrink which may possibly be useful for certain applications.

The invention is of course in no way limited to the hereabove described embodiments and several modifications can be taken into account within the scope of the invention a.o. concerning the relative amounts of the as blowing agent used chloropropane and also concerning the composition of the reaction mixture for the polyisocyanurate foam or the with polyurethane modified polyisocyanurate foam preparation according to the invention.

What is claimed is:

1. A polyisocyanurate foam or polyurethane modified polyisocyanurate foam having a mainly closed cell structure, and comprising closed cells wherein chloropropane gas is enclosed either alone or in combination with a different gas.

2. A polyisocyanurate foam or a polyurethane modified polyisocyanurate foam according to claim 1, wherein said chloropropane is comprised mainly of 2-chloropropane.

3. A polyisocyanurate foam or a polyurethane modified polyisocyanurate foam, according to either one of claims 1 and 2, wherein the gas present in the cells comprises at least 90% by weight of chloropropane.

4. A method for preparing mainly closed, cell shaped polyisocyanurate foam or polyurethane modified polyisocyanurate foam, wherein foam formation is performed with the use of a physical blowing agent comprising chloropropane.

5. A method according to claim 4, wherein said physical blowing agent comprises at least 90% chloropropane.

6. A method according to claim 4, wherein chloropropane is used together with a chlorofluorohydrocarbon blowing agent.

7. A method according to claim 4, wherein chloropropane is used in combination with other inert compounds having a relatively low boiling point or sublimation point.

8. A method according to claim 4, wherein said chloropropane comprises mainly of 2-chloropropane.

9. A method according to claim 4, wherein a physical blowing agent amount is used which is comprised between 1 and 50 parts by weight per 100 parts by weight of said polyisocyanurate foam or polyurethane modified polyisocyanurate foam.

10. A method according to claim 6, wherein said chlorofluorohydrocarbon blowing agent is selected from the group consisting of trifluoroethane and dichlorofluoroethane.

11. A method according to claim 7, wherein said inert compound is selected from the group consisting of pentane, isopentane, pentane, cyclopentane, cyclopentene, methyl formate, dimethylether and diethylether.

12. A method according to claim 9, wherein said physical blowing agent is used in an amount of between 1 and 30 parts by weight per 100 parts by weight of polyisocyanurate foam or polyurethane modified polyisocyanurate foam.

* * * * *